United States Patent
Kim et al.

(10) Patent No.: US 11,650,873 B2
(45) Date of Patent: May 16, 2023

(54) MEMORY CONTROLLER, METHOD OF OPERATING THE MEMORY CONTROLLER, AND STORAGE DEVICE INCLUDING MEMORY CONTROLLER

(71) Applicant: SAMSUNG ELECTRONICS CO., LTD., Suwon-si (KR)

(72) Inventors: Junghoon Kim, Yongin-si (KR); Seonghun Kim, Suwon-si (KR); Jongsung Na, Hwaseong-si (KR); Seona Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 22 days.

(21) Appl. No.: 17/205,687

(22) Filed: Mar. 18, 2021

(65) Prior Publication Data
US 2021/0382772 A1    Dec. 9, 2021

(30) Foreign Application Priority Data

Jun. 5, 2020    (KR) .................. 10-2020-0068603

(51) Int. Cl.
*G06F 11/07*    (2006.01)
*G06F 11/30*    (2006.01)
*G06N 20/00*    (2019.01)

(52) U.S. Cl.
CPC ........ *G06F 11/079* (2013.01); *G06F 11/0727* (2013.01); *G06F 11/0751* (2013.01); *G06F 11/0775* (2013.01); *G06F 11/3034* (2013.01); *G06N 20/00* (2019.01)

(58) Field of Classification Search
CPC .... G06F 11/079; G06F 11/0727; G06F 11/07; G06F 11/3034; G06F 11/3466; G06F 11/3065; G06F 12/0238; G06F 21/52
See application file for complete search history.

(56) References Cited

U.S. PATENT DOCUMENTS

| | | |
|---|---|---|
| 7,886,148 B2 * | 2/2011 | Kiriansky ............. G06F 21/554 726/17 |
| 8,141,163 B2 | 3/2012 | Pike |
| 8,538,011 B2 | 9/2013 | Moskowitz |
| 8,751,821 B2 | 6/2014 | Mantin et al. |
| 9,208,317 B2 | 12/2015 | Shua et al. |
| 2008/0256347 A1 | 10/2008 | Eickemeyer et al. |
| 2009/0307452 A1 | 12/2009 | Hahn et al. |
| 2011/0010697 A1 | 1/2011 | Golovkin |

(Continued)

OTHER PUBLICATIONS

Communication dated Aug. 25, 2021 issued by the European Patent Office in application No. 21157440.5.

(Continued)

*Primary Examiner* — Yolanda L Wilson
(74) *Attorney, Agent, or Firm* — Sughrue Mion, PLLC

(57) ABSTRACT

Provided are a memory controller, a method of operating the memory controller, and a storage device including the memory controller. The method includes performing a first operation on a non-volatile memory; storing a first code path corresponding to pieces of codes executed as the first operation is performed in a history buffer; comparing the first code path with a plurality of reference code paths related to the first operation; and identifying whether the first operation is abnormally performed based on a result of the comparison.

19 Claims, 17 Drawing Sheets

(56) References Cited

U.S. PATENT DOCUMENTS

| | | |
|---|---|---|
| 2012/0185936 A1* | 7/2012 | Lakshminarayanan ..................... G06F 21/554 726/22 |
| 2013/0061326 A1 | 3/2013 | Bennett |
| 2015/0269012 A1* | 9/2015 | Coronado ............. G06F 11/079 714/37 |
| 2016/0147586 A1* | 5/2016 | Mayer ................. G06F 11/0721 714/37 |
| 2017/0277916 A1 | 9/2017 | Natarajan et al. |
| 2018/0081747 A1* | 3/2018 | Viste .................... G05B 19/058 |
| 2019/0378542 A1* | 12/2019 | Didehban ........... G06F 11/1489 |
| 2020/0089566 A1 | 3/2020 | You et al. |
| 2020/0174687 A1 | 6/2020 | Lee |

OTHER PUBLICATIONS

Semeen Rehman et al., "Reliable Software for Unreliable Hardware: Embedded Code Generation Aiming at Reliability", IEEE, Oct. 9-14, 2011, pp. 237-246 (11 pages total).

* cited by examiner

FIG. 5B

| CODE PATH DICTIONARY | | DIC |
|---|---|---|
| OPERATION | REFERENCE CODE PATH |
| WRITE | RCDP_W1 |
| | RCDP_W2 |
| | RCDP_W3 |
| READ | RCDP_R1 |
| | RCDP_R2 |
| | RCDP_R3 |
| ERASE | RCDP_E1 |
| | RCDP_E2 |
| | RCDP_E3 |

MEMORY CONTROLLER, METHOD OF OPERATING THE MEMORY CONTROLLER, AND STORAGE DEVICE INCLUDING MEMORY CONTROLLER

CROSS-REFERENCE TO RELATED APPLICATION

This application claims priority from Korean Patent Application No. 10-2020-0068603, filed on Jun. 5, 2020, in the Korean Intellectual Property Office, the disclosure of which is incorporated herein by reference in its entirety.

BACKGROUND

Methods, apparatuses and systems consistent with example embodiments relate to a semiconductor device, and more particularly, to a memory controller, a method of operating the memory controller, and a storage device including the memory controller.

Recently, storage devices including a non-volatile memory such as an embedded multi-media card (eMMC), a universal flash storage (UFS), a solid state drive (SSD), a NAND flash storage, and a memory card are being widely used. A memory controller provided in a storage device may control data write and read operations for a non-volatile memory and may also manage the non-volatile memory. The memory controller may operate as firmware for controlling the non-volatile memory is executed, the firmware may include pieces of code, and data generated by executing the pieces of code and the firmware may be stored in a memory. Due to process miniaturization and reduction in power consumption, random memory corruption in memory such as a soft error increases. Therefore, the storage device may operate abnormally, because codes cannot be executed normally by the memory controller.

SUMMARY

Example embodiments provide a memory controller capable of determining whether an operation performed on a non-volatile memory is performed normally or abnormally and, when it is determined that the operation is abnormally performed, performing a recovery operation for a storage device or an abnormally performed operation, a method of controlling the memory controller, and a storage device including the memory controller.

According to an aspect of an example embodiment, there is provided a method of operating a memory controller configured to control a non-volatile memory, the method including performing a first operation on the non-volatile memory; storing a first code path corresponding to pieces of codes executed as the first operation is performed in a history buffer; comparing the first code path with a plurality of reference code paths related to the first operation; and identifying whether the first operation is abnormally performed based on a result of the comparison.

According to another aspect of an example embodiment, there is provided a method of operating a memory controller configured to control a non-volatile memory, the method including performing a first operation on the non-volatile memory; storing a first code path corresponding to pieces of codes executed as the first operation is performed in a history buffer; executing a formula, which is generated based on a plurality of normal reference code paths related to the first operation, based on the first code path; and identifying whether the first operation is abnormally performed based on an output of the formula.

According to an aspect of an example embodiment, there is provided a storage device including a non-volatile memory; and a memory controller configured to control the non-volatile memory, wherein the memory controller includes a history buffer configured to store a plurality of code paths respectively corresponding to a plurality of operations performed on the non-volatile memory; and a processor configured to implement an abnormal operation determiner configured to identify whether the operations are performed normally or abnormally based on the code paths.

BRIEF DESCRIPTION OF THE DRAWINGS

The above, and other aspects, features and advantages will be more clearly understood from the following detailed description of example embodiments, taken in conjunction with the accompanying drawings in which:

FIG. 5B is a diagram showing an implementation example of a code path dictionary of FIG. 5A;

DETAILED DESCRIPTION

Figure 1:
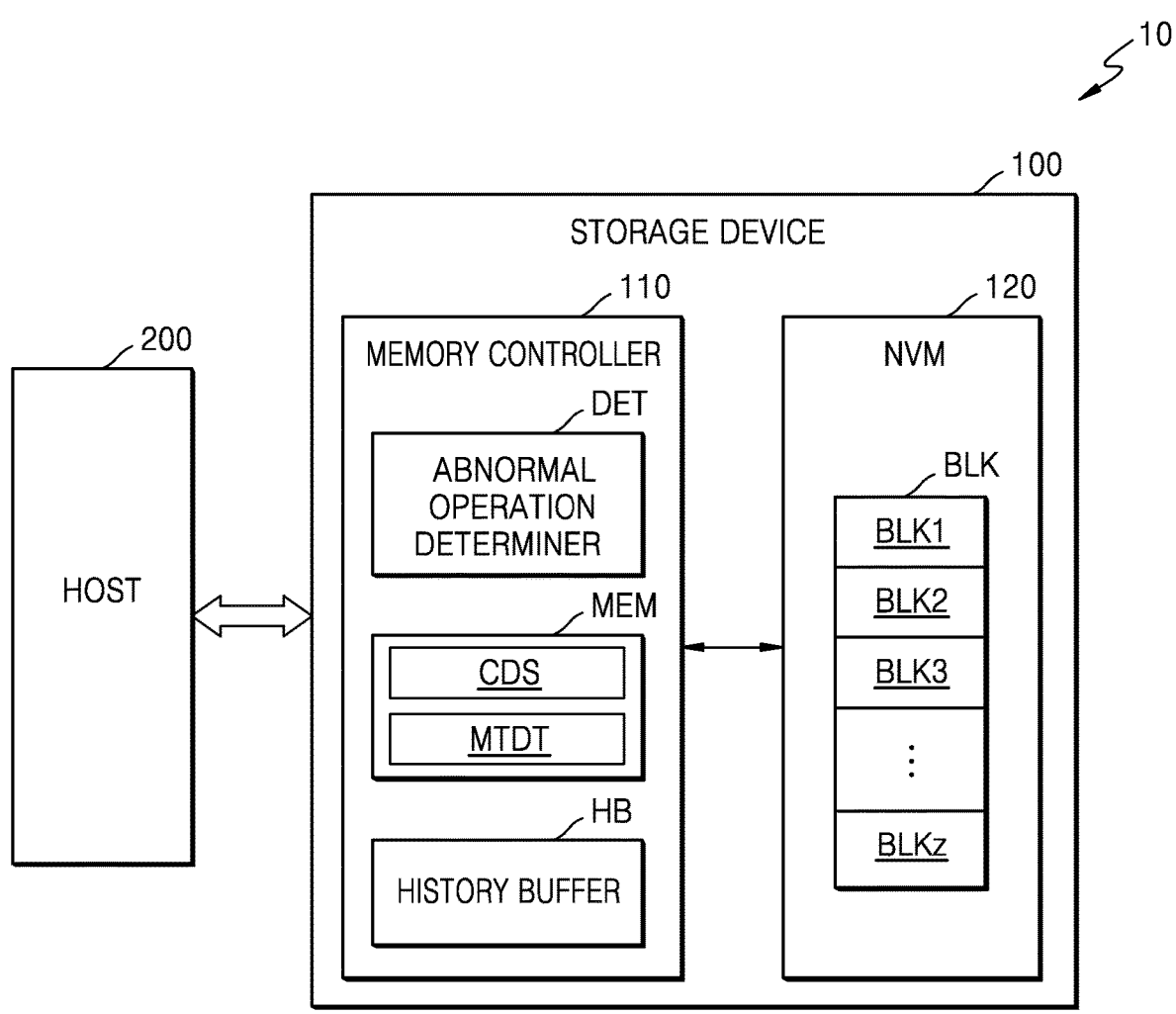
FIG. 1 is a block diagram showing a storage system according to an example embodiment.

FIG. 1 is a block diagram showing a storage system according to an example embodiment.

Referring to FIG. 1, a storage system 10 may include a storage device 100 and a host 200, and the storage device 100 may include a memory controller 110 and a non-volatile memory (NVM) 120. The memory controller 110 may include an abnormal operation determiner DET, a history buffer HB, and a memory MEM.

The host 200 may refer to a data processing device capable of processing data, e.g., a central processing unit (CPU), a processor, a microprocessor, an application processor (AP), etc. The host 200 may execute an operating system (OS) and/or various applications. For example, the host 200 may be implemented as an AP or a system-on-a-chip (SoC). Furthermore, for example, the host 200 may be implemented as an integrated circuit, a motherboard, or a database server, but is not limited thereto.

The host 200 may communicate with the storage device 100 through various interfaces. The host 200 may transmit a write request or a read request to the storage device 100, and the storage device 100 may write data to the NVM 120 or read data from the NVM 120 in response to the write request or the read request.

The NVM 120 may include a plurality of memory blocks BLK, e.g., first to z-th memory blocks (z is an integer equal to or greater than 2). The memory blocks BLK may each include a plurality of pages, and the pages may each include a plurality of memory cells. For example, a memory block may be an erase unit, and a page may be a write/read unit. In some example embodiments, the memory blocks BLK may include a plurality of memory chips, a plurality of dies, or a plurality of planes. In an example embodiment, the NVM 120 may include a flash memory device, e.g., a NAND flash memory device. However, example embodiments are not limited thereto, and the NVM 120 may include a resistive memory device such as resistive RAM (ReRAM), phase change RAM (PRAM), and magnetic RAM (MRAM). Hereinafter, the NVM 120 will be described as a NAND flash memory device.

The memory blocks BLK may include a 2-dimensional (2D) memory cell array or a 3-dimensional (3D) memory cell array. In an example embodiment, at least one memory block from among the memory blocks BLK may include a 3D memory cell array. The 3D memory cell array includes arrays of memory cells that are arranged on a silicon substrate and have active regions or a circuit related to operations of the memory cells and is monolithically formed on the substrate or in at least one physical level of a circuit formed in the substrate. The term "monolithic" indicates that layers of levels constituting the 3D memory array are stacked directly on layers of lower levels of the 3D memory array. In an example embodiment, the 3D memory cell array includes vertical NAND strings arranged in a vertical direction, such that at least one memory cell is on top of another memory cell. The at least one memory cell may include a charge trapping layer.

U.S. Pat. Nos. 7,679,133, 8,553,466, 8,654,587, and 8,559,235 and U.S. Patent Application Publication No. 2011/0233648, the disclosures of which are incorporated herein by reference, disclose appropriate configurations regarding a 3D memory cell array in which a plurality of levels are provided and word lines and/or bit lines are shared between the levels.

The memory controller 110 may control all operations of the storage device 100, store data received from the host 200 in the NVM 120, and read and provide data from the NVM 120 to the host 200.

The memory controller 110 may control the NVM 120. The memory controller 110 may perform various operations on the NVM 120 such as a write operation, a read operation, and an erase operation. In this case, when the memory controller 110 performs a write operation, a read operation, or an erase operation on the non-volatile memory, the memory controller 110 controls the NVM 120 to perform a write operation, a read operation, or an erase operation. For example, when data and a logical address are received from the host 200 along with a write request, the memory controller 110 may convert the logical address into a physical address representing a physical region in the NVM 120 and provide the physical address, a write command, and the data to the NVM 120, thereby controlling the NVM 120 to store data, that is, to program data to a memory cell array.

The memory controller 110 may perform an operation for managing the NVM 120 such as garbage collection and wear-leveling, and may also perform an operation for detecting and recovering an error of data written to the NVM 120 such as an error check and correction (ECC) function. The above-stated operations may include combinations of a write operation, a read operation, and an erase operation.

The abnormal operation determiner DET may verify whether an operation performed by the memory controller 110 is abnormally performed. For example, the abnormal operation determiner DET may determine whether a performed operation is an abnormal operation or a normal operation.

An operation performed by the memory controller 110, e.g., a write operation, a read operation, and an erase operation, may be performed by executing firmware or software including pieces of codes. The abnormal operation determiner DET may determine whether an operation is an abnormal operation or a normal operation based on a code path that is generated based on pieces of codes executed as the operation is performed, that is, a code path corresponding to the performed operation.

The memory MEM may store pieces of codes CDS constituting the operations and data generated as the operations are performed, e.g., metadata MTDT.

The codes CDS may constitute at least one of a write operation, a read operation, and an erase operation. In an example embodiment, a plurality of code sets each including pieces of codes CDS may constitute each of a write operation, a read operation, and an erase operation.

The metadata MTDT may include various data for management of the NVM 120 such as mapping data between a logical address and a physical address and write and erase counts for the memory blocks BLK. The memory controller 110 may perform an operation on the NVM 120 based on the metadata MTDT, and, when the metadata MTDT is changed as the operation is performed, may update the metadata MTDT in the memory MEM.

The memory MEM may be implemented as a volatile memory such as static random access memory (SRAM) and dynamic RAM (DRAM) or a resistive memory such as a resistive RAM (ReRAM), a phase change RAM (PRAM), and a magnetic RAM (MRAM).

Although FIG. 1 shows that the codes CDS and the metadata MTDT are stored in one memory MEM included in the memory controller 110, example embodiments are not limited thereto. In an example embodiment, the memory MEM may include two or more RAMs, and at least one of two or more RAMs may be provided within the memory controller 110, and at least another one of the two or more RAMs may be provided outside the memory controller 110 and connected to the memory controller 110. The codes CDS and the metadata MTDT may be stored in the two or more RAMs, respectively.

The codes CDS and the metadata MTDT may be stored in the NVM 120 and may be loaded to the memory MEM when the storage device 100 is operated. For example, when the storage device 100 is booted, at least one of the codes CDS and at least a part of metadata MTDT may be loaded to the memory MEM. Also, changed metadata MTDT may be periodically or aperiodically stored in the NVM 120.

The history buffer HB may be implemented with one of SRAM, DRAM, and various other RAMs and may store a code path corresponding to an operation performed by the memory controller 110. A plurality of operations may be performed by the memory controller 110, and the history buffer HB may store a plurality of code paths respectively corresponding to the operations.

A code path may include a code address corresponding to each piece of code executed as the memory controller 110 performs an operation. The code address may indicate a location at which each piece of code is stored in the memory MEM. For example, the code address may include an address of the memory MEM. However, example embodiments are not limited thereto, and the code address may include an address of a hardware functional block provided in the memory controller 110 or an address of a register provided in the hardware functional block. For example, the memory controller 110 may include functional blocks implemented as hardware components such as a host interface (113 in FIG. 8A), an NVM interface (114 in FIG. 8A), a direct memory access (DMA) controller, and an error checking and correction code (ECC) circuit, wherein the code address may be an address of each of the functional blocks. For example, the code address may be a system address of the memory controller 110.

In an example embodiment, the code path may also include a data address at which data generated or changed when an operation is performed (e.g., the metadata MTDT) is stored and a data value thereof. The data address may be the system address of the memory controller 110. For example, the data address may include an address of the memory MEM, an address of a hardware functional block, or an address of a register provided in the hardware functional block. A data value may be stored in a region corresponding to the data address, e.g., the memory MEM. Also, a data value may be stored in a hardware functional block corresponding to a data address or a register of the hardware functional block, and the data value may be used in the hardware functional block.

Figure 2A:
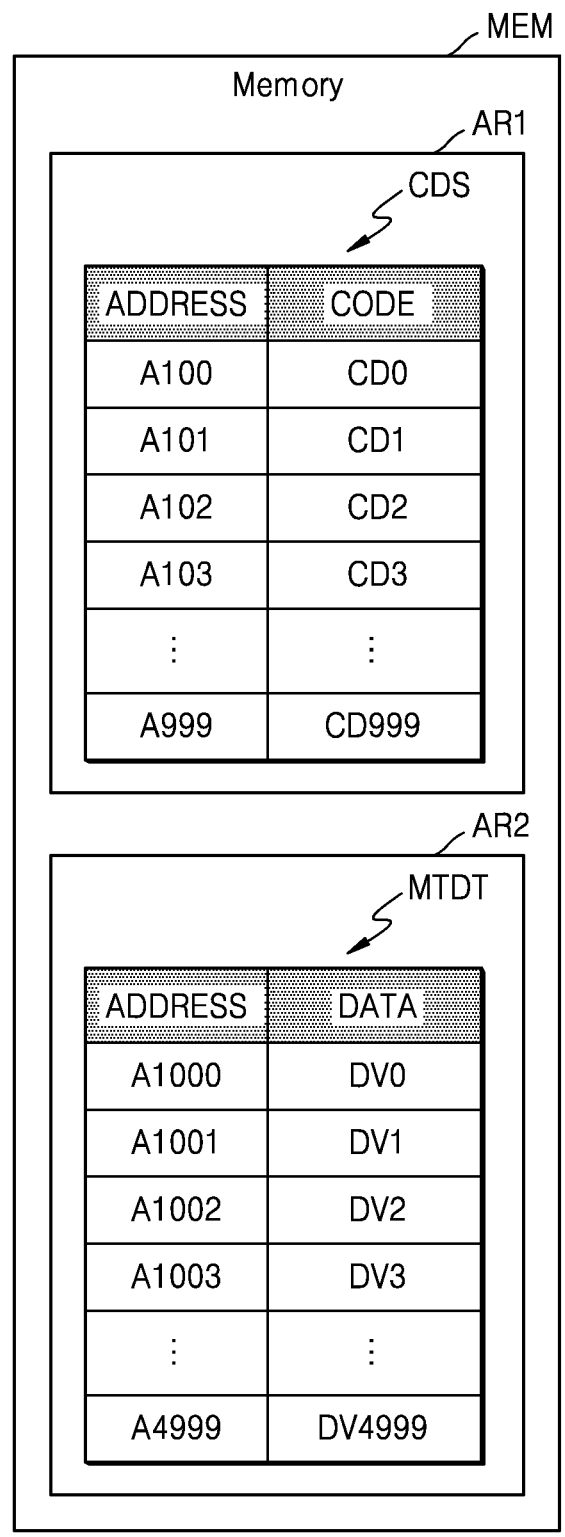
FIGS. 2A and 2B are diagrams showing examples in which pieces of codes and metadata are stored in a memory of FIG. 1.
Figure 2B:
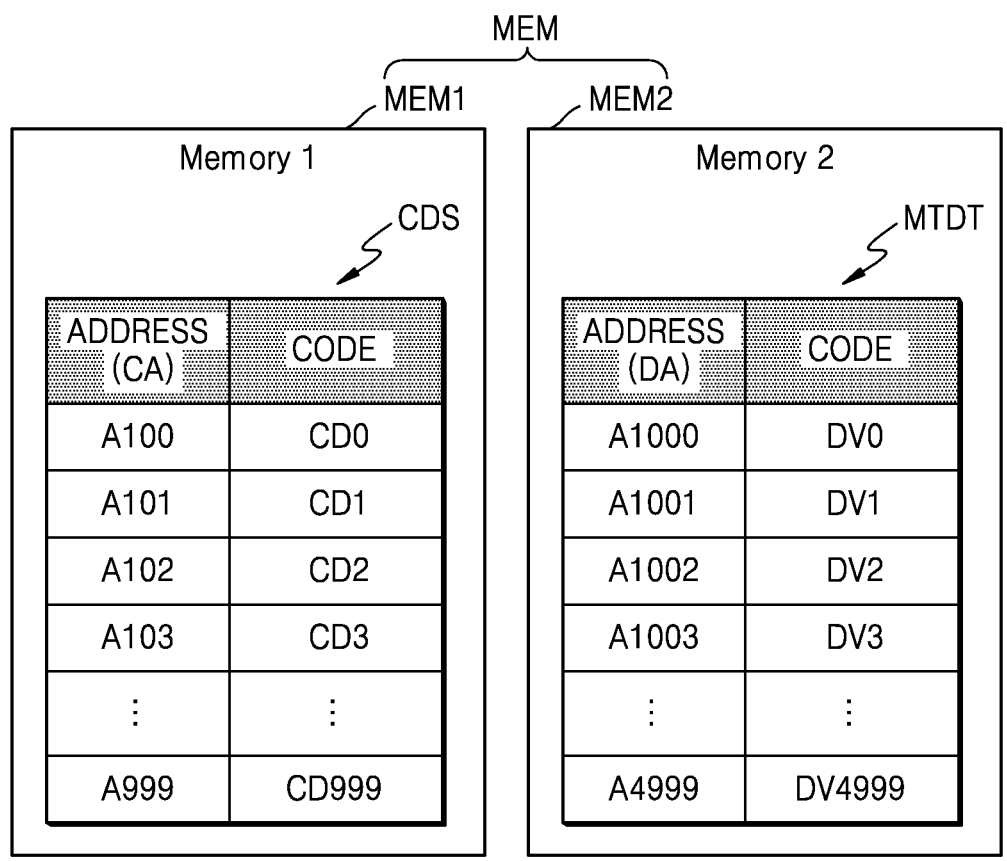

FIGS. 2A and 2B are diagrams showing examples in which pieces of codes and metadata are stored in a memory of FIG. 1.

Referring to FIG. 2A, the memory MEM may include a plurality of regions, e.g., a first region AR1 and a second region AR2. Codes CDS may be stored in the first region AR1, and the metadata MTDT may be stored in the second region AR2. The first region AR1 may include a plurality of addresses such as code addresses A100 to A999, and the codes CDS such as code CD0 to CD999 may be stored at locations corresponding to the code addresses, respectively. Here, an address may be a system address that may be recognized by the processor (111 in FIG. 8A) of the memory controller 110, e.g., an address of the memory MEM.

The second region AR2 may include a plurality of addresses, e.g., data addresses A1000 to A4999, and a plurality of data values constituting the metadata MTDT, e.g., data values DV0 to DV4999, may be stored at locations corresponding to the data addresses, respectively. Hereinafter, an address indicating a location where code is stored will be referred to as a code address CA, whereas an address indicating a location where data is stored will be referred to as a data address DA.

Referring to FIG. 2B, the memory MEM may include a first memory MEM1 and a second memory MEM2 that are physically distinguished from each other. The codes CDS may be stored in the first memory MEM1 and the metadata MTDT may be stored in the second memory MEM2. For example, the first memory MEM1 may be SRAM provided in the memory controller 110 in FIG. 1, and the second memory MEM2 may be implemented as DRAM connected to the memory controller 110.

Referring to FIG. 1, the memory controller 110 may perform a first operation (e.g., one of a write operation, a read operation, and an erase operation) on the NVM 120, refer to a plurality of first code addresses corresponding to pieces of first code constituting the first operation, and store the first code addresses referred to when the first operation is performed in the history buffer HB as a code path regarding the first operation. Here, the term 'first' is only used to distinguish a particular operation from other operations and does not indicate an order in which operations are performed.

For example, when the memory controller 110 performs a write operation, a processor in the memory controller 110 may access the memory MEM and execute pieces of write code constituting the write operation. At this time, a plurality of write code addresses corresponding to the pieces of write code may be stored in a plurality of registers in the processor, and the processor may access the memory MEM based on the write code addresses stored in the registers to read out and execute the pieces of write code. The memory controller 110 may store the write code addresses, which are referred to access the pieces of write code related to the write operation, as a code path in the history buffer HB. The memory controller 110 may store the code path in the history buffer HB when the write operation is performed or after the write operation is performed. The write code addresses may be stored in the order the write code addresses are referred to, that is, the order the codes are executed.

Figure 3:
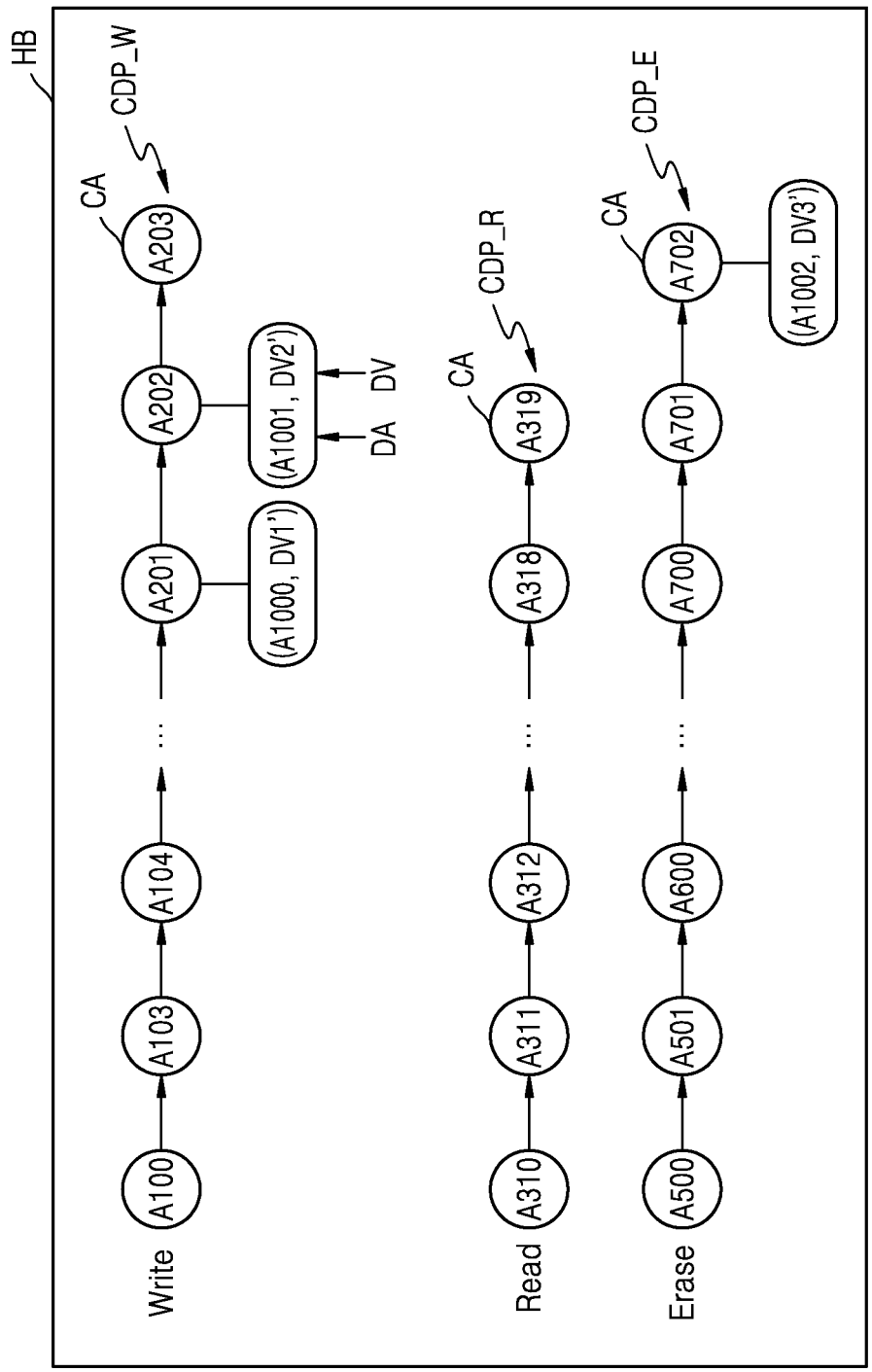
FIG. 3 is a diagram showing an example of a code path stored in the history buffer of FIG. 1.

FIG. 3 is a diagram showing an example of a code path stored in the history buffer of FIG. 1.

Referring to FIG. 3, code paths respectively corresponding to a write operation, a read operation, and an erase operation, e.g., a write code path CDP_W, a read code path CDP_R, and an erase code path CDP_E, may be stored in the history buffer (HB of FIG. 1).

The write code path CDP_W, the read code path CDP_R, and the erase code path CDP_E may each include a plurality of code addresses CA, wherein the code addresses CA may be sorted in an order referred to when the memory controller (110 of FIG. 1) performs a corresponding operation. In the case of a write operation or an erase operation, metadata may be changed while the write operation or the erase operation is being performed. For example, some data included in the metadata may be updated or data may be added to the metadata. Hereinafter, metadata that is partially updated or data added to the metadata will be referred to as changed metadata. The write code path CDP_W and the erase code path CDP_E may each include a data address DA at which the changed metadata is stored and may also include a data value DV stored at the data address DA. As described above with reference to FIG. 1, the code address CA and the data address DA are system addresses of the memory controller 110 and may include addresses of the memory MEM, addresses of hardware functional blocks, or addresses of registers provided in the hardware functional blocks.

For example, the write code path CDP_W may include a plurality of code addresses CA referred to when a write operation is performed, e.g., A100, A103, A104, ..., A201, A202, and A203. In addition, the write code path CDP_W may include a data address DA A1000 at which data generated or changed (e.g., metadata) as write code corresponding to a code address CA A201 is executed is stored and a data value DV1' and may include a data address DA A1001 at which data generated or changed as write code corresponding to a code address CA A202 is executed is stored and a data value DV2'.

The read code path CDP_R may include a plurality of code addresses CA referred to when a read operation is performed, e.g., A310, A311, A312, . . . A318 and A319.

The erase code path CDP_E may include a plurality of code addresses CA referred to when an erase operation is performed, e.g., A500, A501, A600, . . . , A700, A701, and A702. Also, the erase code path CDP_E may include a data address DA A1002 at which data generated or changed as an erase code corresponding to a code address CA A702 is executed is stored and a data value DV3'.

Every time the memory controller 110 performs an operation, e.g., a write operation, a read operation, and an erase operation, a code path corresponding to the operation may be stored in the history buffer HB.

Referring to FIG. 1, as described above, based on a code path stored in the history buffer HB, the abnormal operation determiner DET may determine whether an operation corresponding to the code path is abnormally performed. The abnormal operation determiner DET may determine whether an operation corresponding to a code path is an abnormal operation or a normal operation by determining whether the code path is normal or abnormal (that is, the integrity of the code path) based on a plurality of reference code paths. When a code path has a fault, the abnormal operation determiner DET may determine that a corresponding operation is an abnormal operation. When a code path has integrity, the abnormal operation determiner DET may determine that a corresponding operation is a normal operation.

A reference code path is a code path corresponding to an operation determined to be normally performed operations, and integrity thereof may be guaranteed. A reference code path may have substantially the same structure as the write code path CDP_W, the read code path CDP_R, and the erase code path CDP_E described above with reference to FIG. 3.

In an example embodiment, in the manufacturing stage of the storage device 100, the memory controller 110 may perform a plurality of operations such as a write operation, a read operation, and an erase operation, a plurality of code paths respectively corresponding to a plurality of operations determined as normally performed operations may be obtained, and the code paths may be used as a plurality of reference code paths.

In an example embodiment, the abnormal operation determiner DET may determine the integrity of a code path by comparing a code path corresponding to a determination target (that is, an operation to be determined whether the operation is abnormally performed) with the reference code paths.

In an example embodiment, a determination formula (or a determination algorithm) for determining the integrity of a code path may be generated in advance based on a plurality of reference code paths, and the abnormal operation determiner DET may determine the integrity of a code path by applying the code path to the determination formula. For example, the determination formula may be generated through machine learning based on a plurality of reference code paths.

The abnormal operation determiner DET may determine whether an operation is an abnormal operation or a normal operation based on a code path every time an operation is performed or, after a plurality of operations are performed, may determine whether the operations are abnormal operations or normal operations based on a plurality of code paths. For example, the abnormal operation determiner DET may verify an operation when each of a plurality of operations is performed or verify each of the operations after the operations are performed.

In an example embodiment, when a plurality of code paths equal to or more than a certain number are stored in the history buffer HB (that is, the remaining storage capacity of the history buffer HB is less than or equal to a reference capacity), the abnormal operation determiner DET may determine the integrity of each of a plurality of code paths stored in the history buffer HB, thereby verifying a plurality of operations respectively corresponding to the code paths. In an example embodiment, at a time point at which the metadata MTDT needs to be stored in the NVM 120, the abnormal operation determiner DET may verify each of a plurality of operations performed up to the time point based on a plurality of code paths stored in the history buffer HB.

Due to process refinements (e.g., reduction in the size of devices) and lower power consumption (e.g., reduction in voltage level), memory corruption may occur in data stored in the memory MEM or a plurality of registers, and thus an operation may be abnormally performed by the controller 110. For example, a code address stored in a register may be unintentionally altered or a code value of code stored in the memory MEM may be unintentionally altered. Therefore, an operation may be abnormally performed as code corresponding to an unwanted code address is executed or code with an altered code value is executed. Also, when the operation is a write operation or an erase operation and metadata changed by the operation is stored in the memory MEM, a data address indicating a location at which the metadata is stored may be incorrect or an incorrect data value may be stored.

In this way, when abnormal operations are repeatedly performed, a fatal defect may occur in the storage device 100. For example, when a defect occurs in metadata as abnormal operations are performed and the NVM 120 is controlled based on defective metadata, an unrecoverable error may occur when data is stored in the NVM 120 or read from the NVM 120.

Therefore, to prevent an abnormal operation from being performed, during or after an operation is performed, the memory controller 110 according to an example embodiment stores a code path corresponding to the operation in the history buffer HB, and may verify whether the operation is abnormally performed or normally performed based on the code path after the operation is performed or at a predetermined time point. For example, the memory controller 110 may determine whether a corresponding operation is an abnormal operation or a normal operation based on a code path. When there is a defect in at least one code path from among a plurality of code paths stored in the history buffer HB, the memory controller 110 may determine that an operation corresponding to the at least one code path is an abnormal operation and perform a recovery operation for the operation or the storage device 100, thereby preventing a fatal defect from occurring in the storage device 100.

Figure 4:
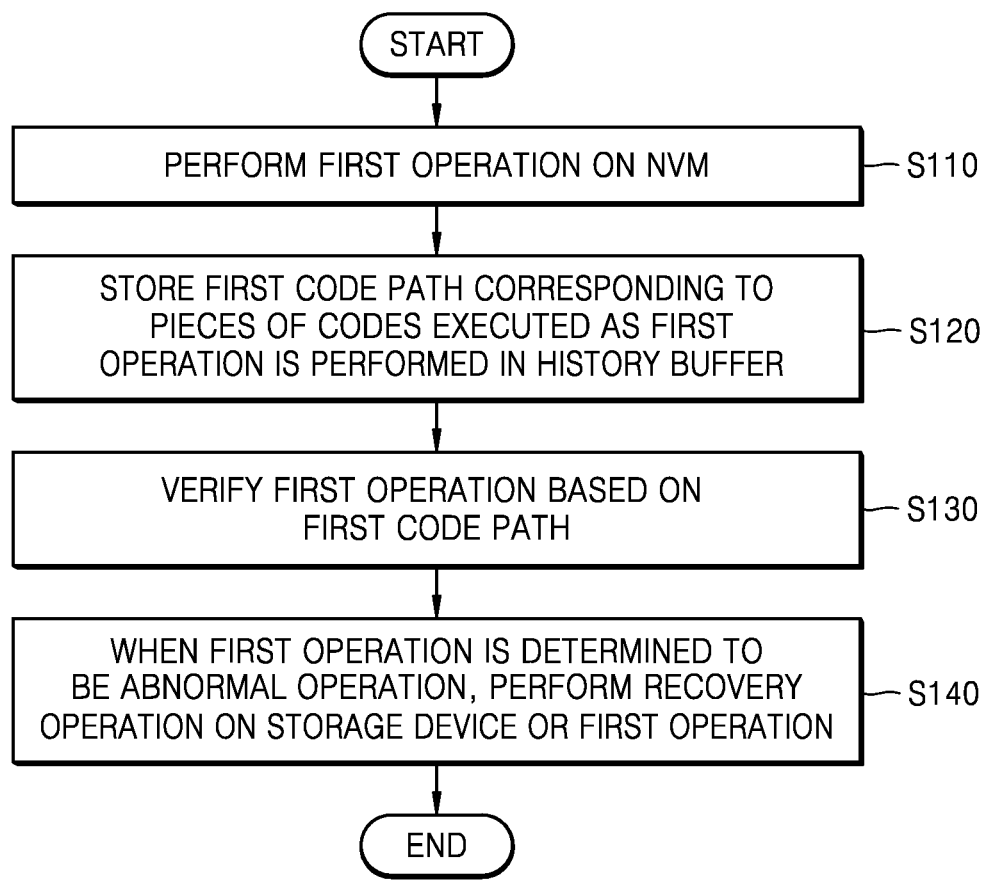
FIG. 4 is a flowchart showing an operation of a memory controller according to an example embodiment.

FIG. 4 is a flowchart showing an operation of a memory controller according to an example embodiment. The method of FIG. 4 may be performed by the memory controller 110 of FIG. 1, and the descriptions given above with reference to FIGS. 1 to 3 may also be applied to a method of operating the memory controller 110 of the present example embodiment.

Referring to FIGS. 1 and 4, the memory controller 110 may perform a first operation on the NVM 120 (operation S110). For example, the first operation may be one of a write operation, a read operation, and an erase operation. However, example embodiments are not limited thereto, and the first operation may be one of various operations performed by the memory controller 110 to control the NVM 120.

The memory controller 110 may store a first code path corresponding to pieces of codes executed as the first operation is performed in the history buffer HB (operation S120). For example, when the memory controller 110 performs a write operation, the memory controller 110 may store a write code path corresponding to pieces of write code executed as the write operation is performed in the history buffer HB. As described above, the write code path may include a plurality of write code addresses corresponding to the write codes, and, when the metadata MTDT is changed, the write code path may also include a data address at which the changed metadata MTDT is stored and a changed data value.

The memory controller 110 may verify the first operation based on the first code path (operation S130). For example, the memory controller 110 may determine whether the first operation is an abnormal operation or a normal operation based on the first code path. For example, the abnormal operation determiner DET may determine the integrity of the first code path based on a plurality of reference code paths, thereby verifying the first operation.

A plurality of code paths for a plurality of normally performed operations may be obtained in advance as a plurality of reference code paths, and the memory controller 110 may determine whether the first operation is an abnormal operation or a normal operation by comparing the first code path with the reference code paths or by applying the first code path as an input to a determination formula generated based on the code paths.

When it is determined that the first operation is an abnormal operation, the memory controller 110 may perform a recovery operation for the storage device 100 or the first operation (operation S140). In an example embodiment, the first operation may be performed according to a request from the host 200, and the memory controller 110 may transmit a response indicating that the first operation is abnormally performed to the host 200. The host 200 may transmit a retry request for the first operation to the memory controller 110, and the memory controller 110 may perform the first operation again. In an example embodiment, the memory controller 110 may control the storage device 100 to be rebooted by performing a power-off sequence. Therefore, a soft error may be resolved, and the memory controller 110 may operate normally.

Figure 5A:
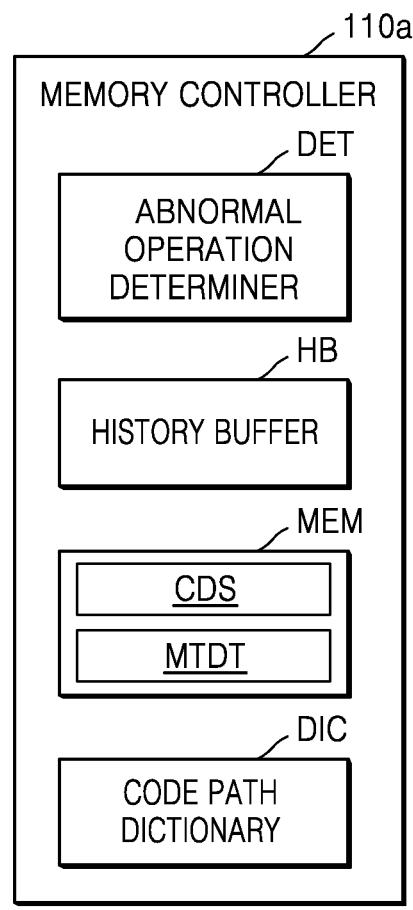
FIG. 5A is a block diagram showing a memory controller according to an example embodiment.

FIG. 5A is a block diagram showing a memory controller according to an example embodiment, and FIG. 5B is a diagram showing an implementation example of the code path dictionary of FIG. 5A.

Referring to FIG. 5A, a memory controller 110a may include the abnormal operation determiner DET, the history buffer HB, the memory MEM, and a code path dictionary DIC. Because the abnormal operation determiner DET, the history buffer HB, and the memory MEM have been described above with reference to FIG. 1, descriptions identical to those already given above will be omitted.

The code path dictionary DIC may include a plurality of reference code paths. The reference code paths may each be a code path corresponding to pieces of codes executed when an operation determined to be a normally performed operation (that is, a normal operation) was performed. The reference code paths may be obtained in advance before a user uses the storage device (100 in FIG. 1). For example, the reference code paths may be obtained at the manufacturing stage of the storage device 100, and the code path dictionary DIC including the reference code paths may be stored in the NVM (120 in FIG. 1). Thereafter, when the storage device 100 is booted, the code path dictionary DIC may be loaded to the memory controller 110. For example, the code path dictionary DIC may be loaded to a separate storage region provided in the memory controller 110 or may be loaded to the memory MEM provided inside or outside the memory controller 110.

As shown in FIG. 5B, the code path dictionary DIC may include a plurality of reference code paths for each of a plurality of operations, e.g., a write operation, a read operation, and an erase operation. For example, the code path dictionary DIC may include first to third write reference code paths RCDP_W1, RCDP_W2, and RCDP_W3 for a write operation, first to third read reference code paths RCDP_R1, RCDP_R2, and RCDP_R3 for a read operation, and first to third erase reference code paths RCDP_E1, RCDP_E2, and RCDP_E3 for an erase operation. However, this is an example, and the code path dictionary DIC may include larger numbers of write reference code paths, read reference code paths, and erase reference code paths, wherein the numbers may vary.

In an example embodiment, the code path dictionary DIC may include data address ranges and data value ranges set for a write operation and an erase operation. For example, a data address range and a data value range for a write operation may be determined based on a plurality of data addresses and a plurality of data values included in the first to third write reference code paths RCDP_W1, RCDP_W2, and RCDP_W3. For example, a data address range and a range of a data value may be determined by quantifying a plurality of data addresses and a plurality of data values, and a data address range and a data value range for an erase operation may be determined based on a plurality of data addresses and a plurality of data values included in the first to third erase reference code paths RCDP_E1, RCDP_E2, and RCDP_E3.

Referring to FIG. 5A, the abnormal operation determiner DET may compare a code path stored in the history buffer HB with a plurality of reference code paths stored in the code path dictionary DIC and determine whether an operation corresponding to the code path is an abnormal operation or a normal operation based on a result of the comparison. In an example embodiment, when the code path stored in the history buffer HB is the same as at least one of a plurality of reference code paths stored in the code path dictionary DIC, the abnormal operation determiner DET may determine that the operation is a normal operation. The abnormal operation determiner DET may determine the sameness based on code addresses included in the code path and code addresses included in the at least one of the reference code paths, as well as the orders of the code addresses. Furthermore, when the operation is a write operation or an erase operation, the abnormal operation determiner DET may determine the sameness based on whether data addresses included in a code path are within a data address range stored (pre-set) in the code path dictionary DIC for a write operation or an erase operation and whether data values included in the code path are within a data value range stored (pre-set) in the code path dictionary DIC for a write operation or an erase operation. When code addresses included in the code path and the at least one of the reference code paths and the orders of the code addresses are not the same, the abnormal operation determiner DET may determine that the operation is an abnormal operation. Also, in relation to a write operation or an erase operation, when data addresses included in a code path are not within a set data address range or data values are not within a set data value range, an operation corresponding to the code path may be determined to be an abnormal operation.

Figure 6:
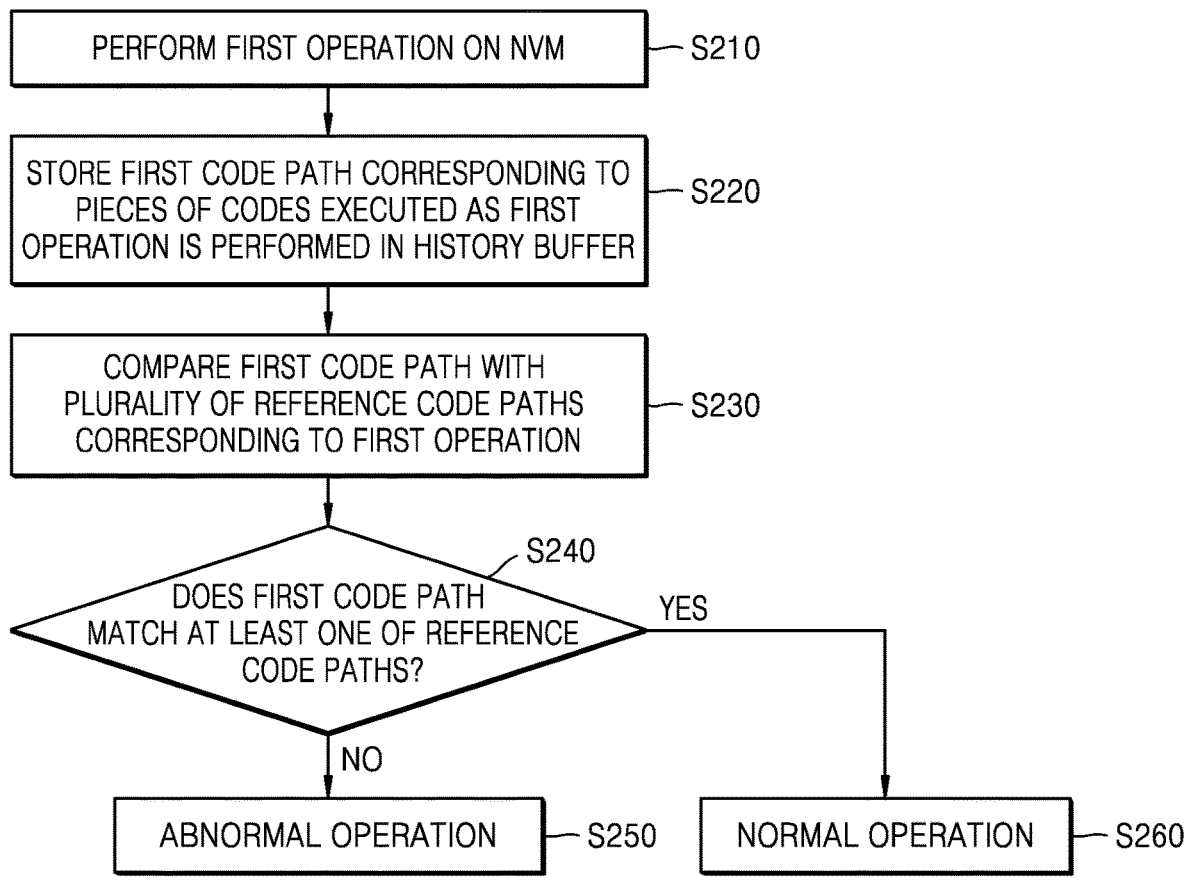
FIG. 6 is a flowchart of a method performed by a memory controller, according to an example embodiment.

FIG. 6 is a flowchart of a method performed by a memory controller, according to an example embodiment. The method in FIG. 6 may determine whether a particular operation performed by the memory controller 110a of FIG. 5A is an abnormal operation or a normal operation.

Referring to FIG. 6, the memory controller 110a may perform a first operation on the NVM (120 in FIG. 1) (operation S210) and store a first code path corresponding to pieces of codes executed as the first operation is performed in the history buffer (HB of FIG. 1) (operation S220). For example, the first operation may be one of a write operation, a read operation, and an erase operation. The first code path may include a plurality of code addresses for pieces of codes executed as the first operation is performed and may also include a data address at which metadata that is changed as the first operation is performed is stored and a data value.

The memory controller 110a may compare the first code path with a plurality of first reference code paths corresponding to the first operation (operation S230). For example, the abnormal operation determiner DET may compare the first code path with the first reference code paths related to the first operation from among a plurality of reference code paths included in the code path dictionary DIC. The abnormal operation determiner DET may compare a plurality of code addresses included in the first code path and a sorting order thereof with a plurality of code addresses included in each of the first reference code path and a sorting order thereof. When the first operation is a write operation or an erase operation, the abnormal operation determiner DET may compare data addresses and data values included in the first code path with data addresses and data values included in the first reference code paths. In an example embodiment, the code path dictionary DIC may include a first data address range and a first data value range for the first operation, and the abnormal operation determiner DET may determine whether the data addresses included in the first code path are within the first data address range and whether the data values included in the first code path are within the first data value range.

The memory controller 110a may determine whether the first code path matches at least one reference code path from among the reference code paths based on a result of the comparison in operation S230 (operation S240). For example, the abnormal operation determiner DET may determine whether the first code path matches at least one first reference code path. For example, the abnormal operation determiner DET may determine whether the first code path has the sameness with respect to at least one reference code path from among the reference code paths. When the first code path does not match any of the first code paths (or does not have the sameness of any of the first code paths), the memory controller 110a may determine that the first code path is defective and the first operation is an abnormal operation (operation S250). When the first code path matches at least one of the first code paths, the memory controller 110a may determine that the first code path has integrity and the first operation is a normal operation (operation S260).

Figure 7A:
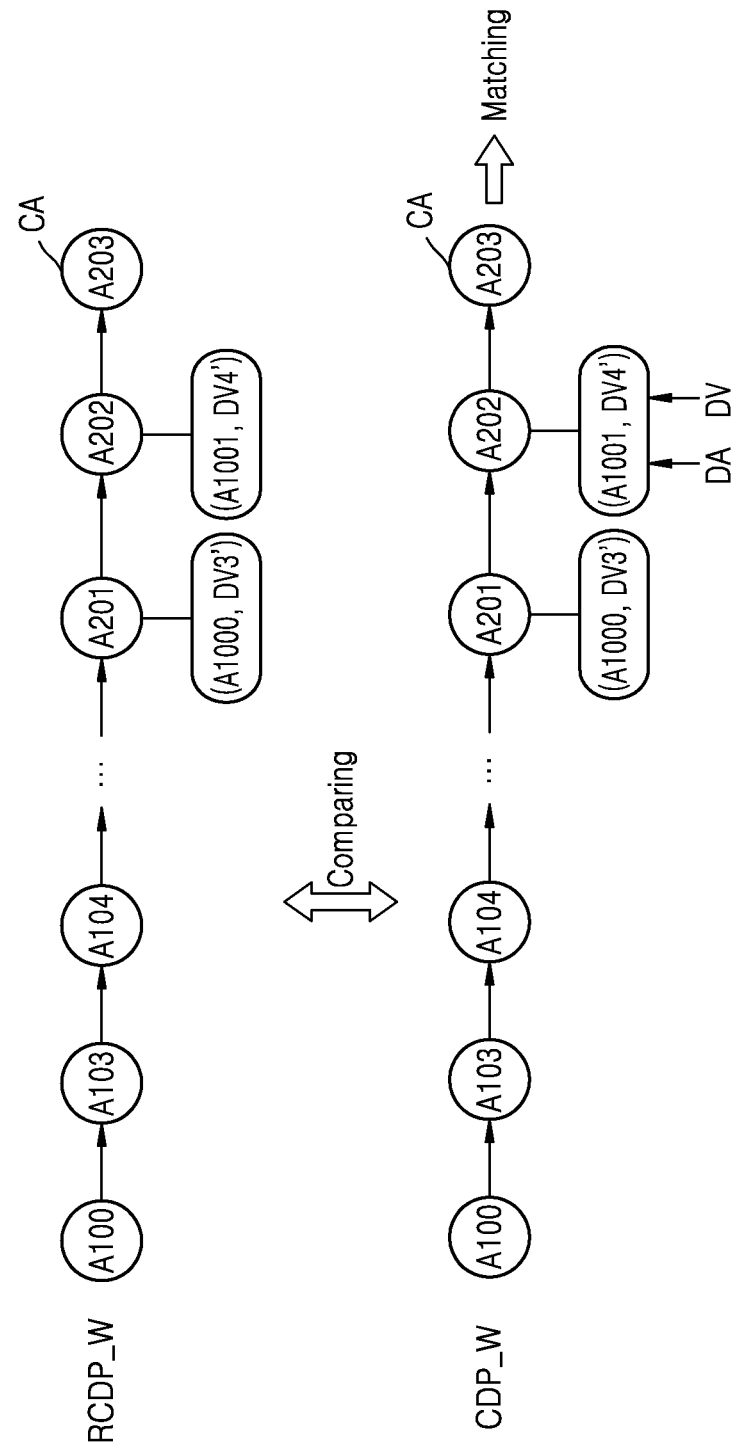
FIGS. 7A and 7B are diagrams showing an example of a method, performed by a memory controller, of determining whether a first code path matches at least one first reference code path, according to an example embodiment.
Figure 7B:
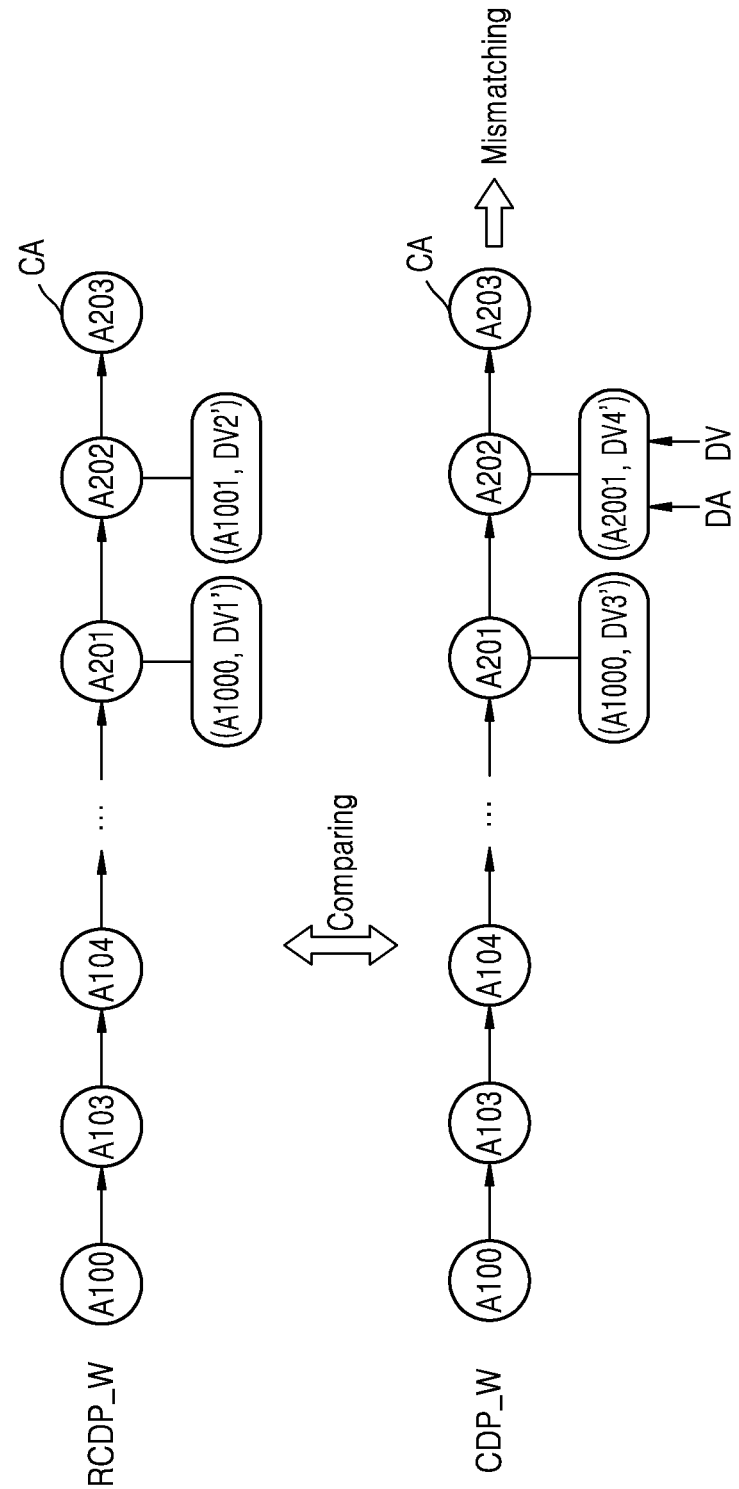

FIGS. 7A and 7B are diagrams showing an example of a method, performed by a memory controller, of determining whether a first code path matches at least one first reference code path according to an example embodiment.

The method of FIGS. 7A and 7B may be performed by the abnormal operation determiner (DET in FIG. 1). A method of comparing the write code path CDP_W with one write reference code path RCDP_W from among a plurality of write reference code paths will be described as an example.

Referring to FIG. 7A, the write code path CDP_W may include a plurality of code addresses CA A100 to A203, data addresses DA A1000 and A1001, and data values DV DV3' and DV4'. The code addresses CA A100 to A203 of the write code path CDP_W may be sorted according to an order a corresponding write code path is executed.

The reference write code path RCDP_W may include a plurality of code addresses CA A100 to A203, data addresses DA A1000 and A1001, and data values DV DV3' and DV4'.

When the write code path CDP_W is compared with the reference write code path RCDP_W, the code addresses CA included in the write code path CDP_W and a sorting order thereof are identical to the code addresses CA included in the reference write code path CDP_W and a sorting order thereof. Also, the data addresses DA and the data values DV included in the write code path CDP_W are identical to the data addresses DA and the data values DV included in the reference write code path RCDP_W. Therefore, it may be determined that the write code path CDP_W matches the reference write code path RCDP_W.

Referring to FIG. 7B, the write code path CDP_W may include a plurality of code addresses CA A100 to A203, data addresses DA A1000 and A2001, and data values DV DV3' and DV4'. The code addresses CA A100 to A203 of the write code path CDP_W may be sorted according to an order a corresponding write code path is executed. The reference write code path RCDP_W may include a plurality of code addresses CA A100 to A203, data addresses DA A1000 and A1001, and data values DV DV1' and DV2'.

When the write code path CDP_W is compared with the reference write code path RCDP_W, the code addresses CA included in the write code path CDP_W and a sorting order thereof are identical to the code addresses CA included in the reference write code path CDP_W and a sorting order thereof. However, a data address DA A2001, which is one from among the data addresses DA included in the write code path CDP_W, is different from the data addresses DA A1000 and A1001 included in the reference write code path RCDP_W. Also, in an example embodiment, when a data address range (e.g., a data address range stored in the history buffer HB) determined based on the data addresses DA of the reference write code paths is set to be from A1000 to A1999, the data address DA A2001 included in the write code path CDP_W is not included in the data address range. Therefore, it may be determined that the write code path CDP_W does not match the reference write code path RCDP_W.

In an example embodiment, for example, even when the data addresses DA included in the write code path CDP_W are identical to the data addresses DA included in the reference write code path RCDP_W (e.g., A1000 and A1001) or are within in an address range from A1000 to A1999, when the data values DV of the write code path CDP_W (e.g., DV3' and DV4') are not within a data value range stored in the history buffer HB, it may be determined that the write code path CDP_W does not match the reference write code path RCDP_W.

Figure 8A:
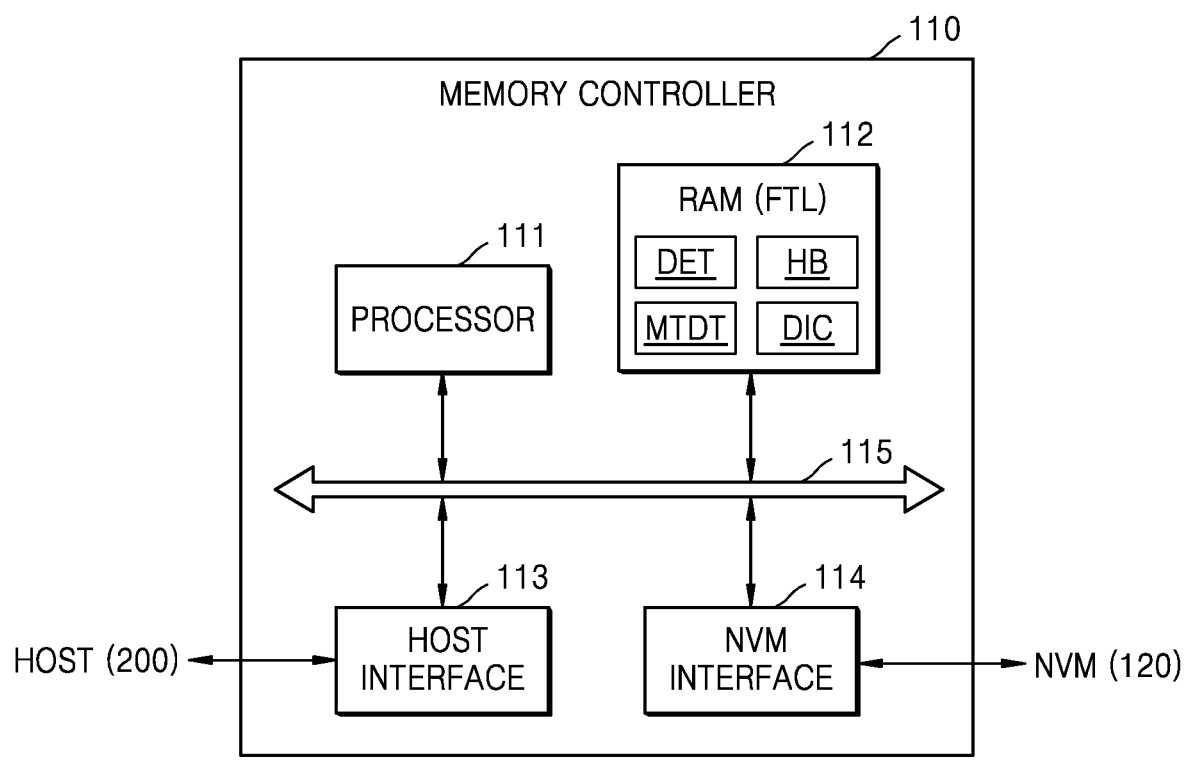
FIGS. 8A and 8B are block diagrams showing a memory controller according to example embodiments.
Figure 8B:
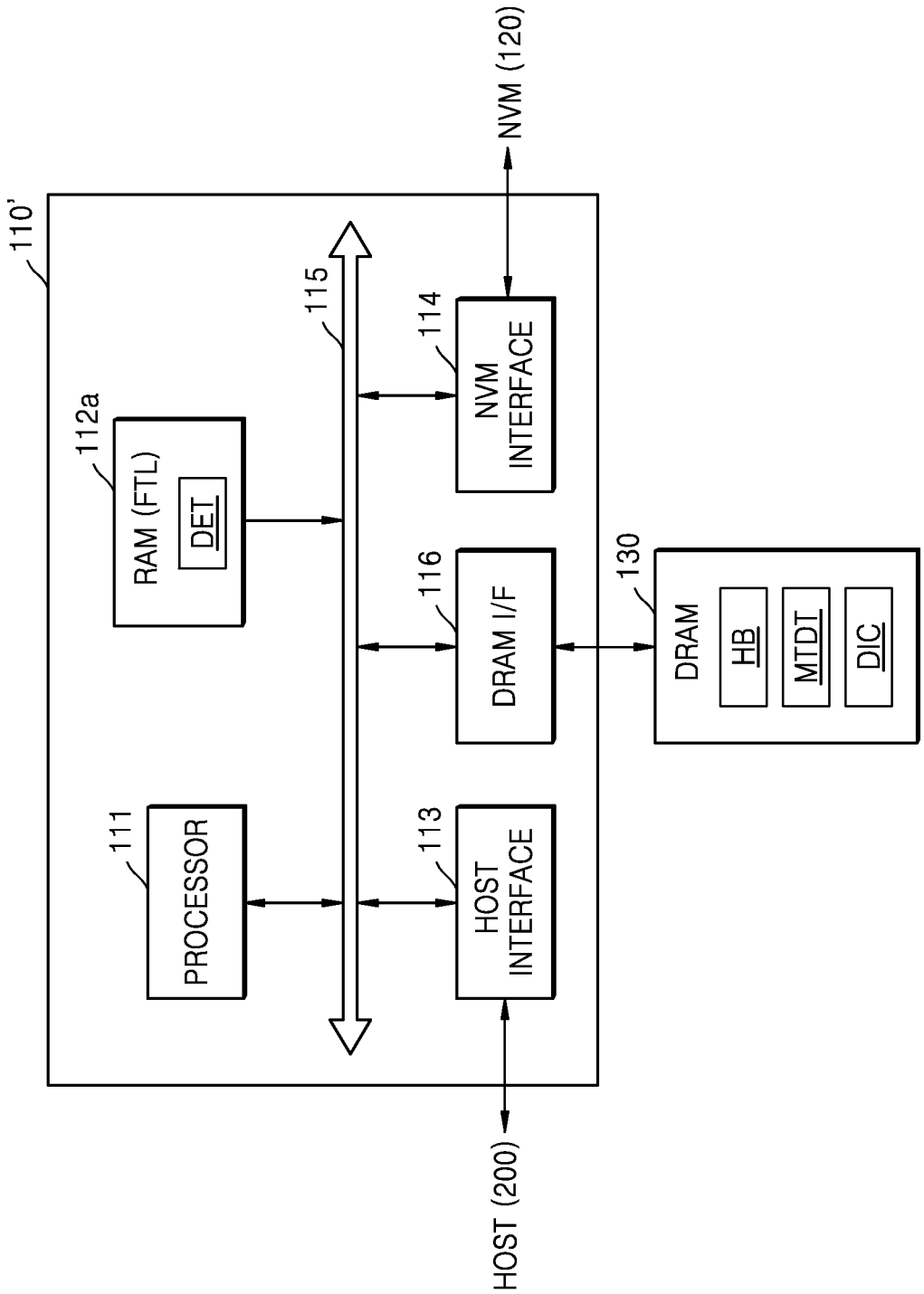

FIGS. 8A and 8B are block diagrams showing a memory controller according to example embodiments.

Referring to FIGS. 1 and 8A, the memory controller 110 may include a processor 111, a RAM 112, a host interface 113, and an NVM interface 114, which may communicate with one another through a bus 115. The memory controller

110 may further include other components, such as a DMA controller, an ECC circuit, etc.

The processor 111 may include a central processing unit or a microprocessor and may control all operations of the controller 110. In an example embodiment, the processor 111 may be implemented as a multi-core processor, e.g., a dual-core processor or a quad-core processor.

The RAM 112 operates under the control of the processor 111 and may be used as an operation memory, a buffer memory, a cache memory, etc. For example, the RAM 112 may be implemented with a volatile memory such as DRAM and SRAM or a non-volatile memory such as PRAM, FRAM, and ReRAM. For example, the RAM 112 may store a flash translation layer (FTL) code that may be executed by the processor 111. For example, when the storage device 100 is booted, the FTL code may be loaded from the NVM 120 to the memory 112.

The abnormal operation determiner DET, the history buffer HB, and the metadata MTDT may be loaded to the RAM 112. In an example embodiment, the code path dictionary DIC may be loaded to the RAM 112. As described with reference to FIG. 5A, the code path dictionary DIC may include a plurality of reference code paths.

The abnormal operation determiner DET may be implemented as firmware or software and may be loaded to the RAM 112. However, example embodiments are not limited thereto. In some example embodiments, the abnormal operation determiner DET may be implemented as hardware or may be provided outside the RAM 112. The metadata MTDT and the code path dictionary DIC may be loaded from the NVM 120 to the memory 112 when the storage device 100 is booted. Also, metadata MTDT may be changed when the memory controller 110 operates, and changed metadata MTDT may be periodically or aperiodically stored in the NVM 120.

The host interface 113 may provide an interface between a host 200 and the controller 110. For example, the host interface 113 may provide an interface based on an universal serial bus (USB), an MMC, a PCIExpress (PCI-E), an AT attachment (ATA), a serial AT attachment (SATA), a parallel AT attachment (PATA), a small computer system interface (SCSI), a serial attached SCSI (SAS), an enhanced small disk interface (ESDI), and an integrated drive electronics (IDE).

The NVM interface 114 may provide an interface between the memory controller 110 and the NVM 120. For example, the metadata MTDT, write data, and read data may be transmitted and received between the memory controller 110 and the NVM 120 through the NVM interface 114. In an example embodiment, the number of NVM interfaces 114 may correspond to the number of NVM chips included in the storage device 100 or the number of channels between the controller 110 and the NVM 120.

Referring to FIGS. 1 and 8B, a memory controller 110' may include the processor 111, a RAM 112a, the host interface 113, the NVM interface 114, and a DRAM interface 116, which may be communicate with one another through the bus 115. Because the controller 110' corresponds to a modified example of the memory controller 110 of FIG. 8A, descriptions identical to those already given above will be omitted.

According to an example embodiment, the history buffer HB and the metadata MTDT may be loaded to the DRAM 130, and the code path dictionary DIC may also be loaded to the DRAM 130. The DRAM interface 116 may provide an interface between the memory controller 110' and the DRAM 130. For example, some data included in the history buffer HB, the metadata MTDT, and the code path dictionary DIC may be transmitted and received between the memory controller 110' and the DRAM 130 through the DRAM interface 116.

Figure 9:
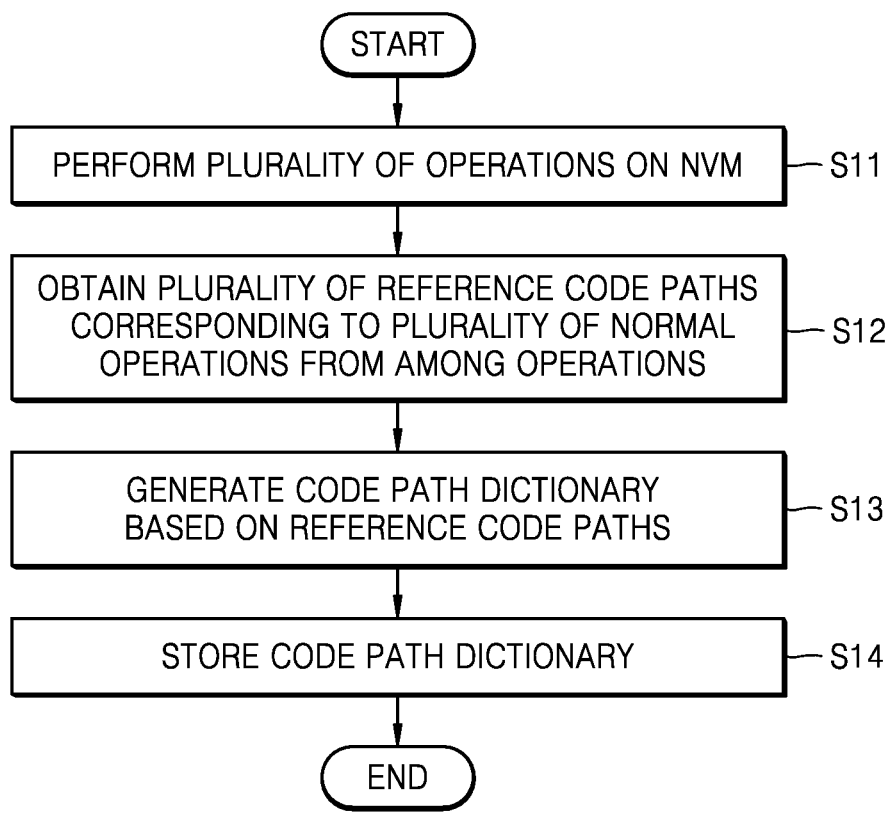
FIG. 9 is a flowchart of a method by which a memory controller according to an example embodiment generates and stores a code path dictionary.

FIG. 9 is a flowchart of a method, performed by a memory controller, of generating and storing a code path dictionary, according to an example embodiment.

Referring to FIGS. 1 and 9, the memory controller 110 may perform a plurality of operations on the NVM 120 (operation S11). For example, the operations may each be one of a write operation, a read operation, and an erase operation. However, example embodiments are not limited thereto, and the operations may each be one of various operations performed by the memory controller 110 to control the NVM 120.

The memory controller 110 may obtain a plurality of reference code paths corresponding to a plurality of normal operations from among the operations (operation S12). The memory controller 110 may obtain a plurality of code paths corresponding to a plurality of normal operations that are determined as normally performed operations from among the operations as a plurality of reference code paths to be used for determining an abnormal operation or a normal operation later. The memory controller 110 may store a plurality of code addresses, which are referred to access pieces of codes related to a normal operation, as a reference code path in an internal or external storage region, e.g., the history buffer HB. Therefore, a plurality of reference code paths corresponding to a plurality of normal operations may be obtained. In an example embodiment a plurality of normal operations for the operations may be determined experimentally in a manufacturing stage or may be determined based on a response from the host 200 after the operations are performed.

The memory controller 110 may generate a code path dictionary based on the obtained reference code paths (operation S13) and store the code path dictionary (operation S14). For example, the memory controller 110 may generate a code path dictionary by converting the reference code paths into a database and store the code path dictionary in the NVM 120.

In an example embodiment, the method of FIG. 9 may be performed in the manufacturing stage of the storage device 100, and, in a stage where a user uses the storage device 100, the code path dictionary may be loaded from the NVM 120 to a storage region in the memory controller 110.

Figure 10:
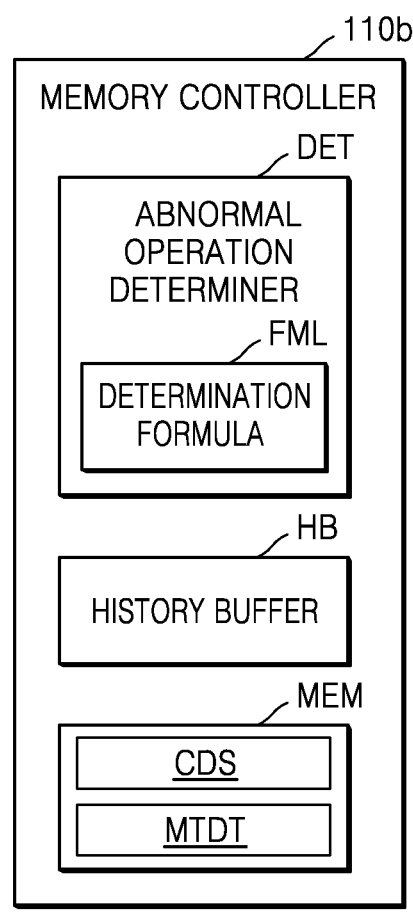
FIG. 10 is a block diagram showing a memory controller according to an example embodiment.

FIG. 10 is a block diagram showing a memory controller according to an example embodiment.

Referring to FIG. 10, a memory controller 110b may include the abnormal operation determiner DET, the history buffer HB, and the memory MEM. Because the history buffer HB and the memory MEM have been described above with reference to FIG. 1, descriptions identical to those already given above will be omitted.

The abnormal operation determiner DET may include a determination formula FML, and, by determining the integrity of a code path based on the determination formula FML, it may be determined whether an operation corresponding to the code path is an abnormal operation or a normal operation.

The determination formula FML may be generated based on the reference code paths described above. For example, as described above with reference to FIG. 9, the memory controller 110b may obtain a plurality of reference code paths and generate the determination formula FML based on the reference code paths. In an example embodiment, the determination formula FML may be generated through machine learning, and a plurality of reference code paths corresponding to all operations determined to be normal operations may be used as training data.

Figure 11:
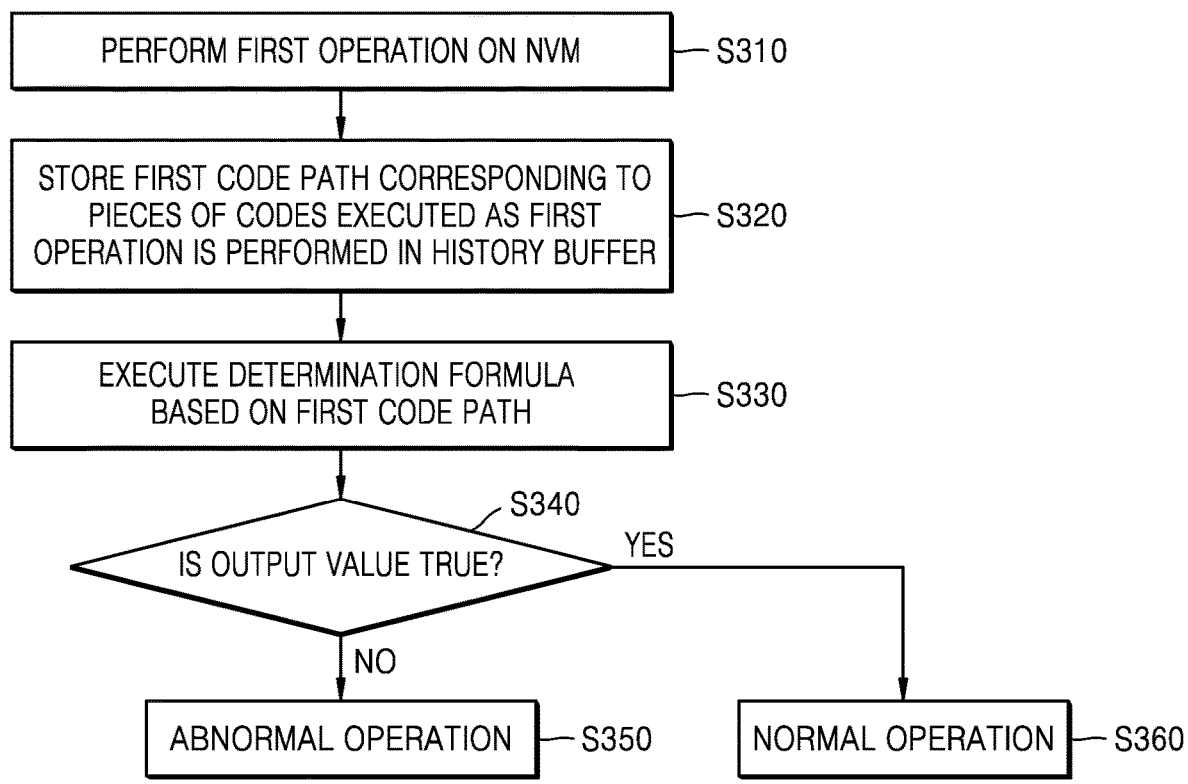
FIG. 11 is a flowchart of a method of operating a memory controller, according to an example embodiment.

FIG. 11 is a flowchart of a method of operating a memory controller, according to an example embodiment. FIG. 11 shows a method by which the memory controller 110b of FIG. 10 determines an abnormal operation or a normal operation.

Referring to FIGS. 10 and 11, the memory controller 110b may perform a first operation on the NVM (120 in FIG. 1) (operation S310) and store a first code path corresponding to pieces of codes executed as the first operation is performed in the history buffer HB (operation S320).

The abnormal operation determiner DET may execute the determination formula FML based on the first code path (operation S330). The abnormal operation determiner DET may execute the determination formula FML by using the first code path stored in the history buffer HB as an input.

The abnormal operation determiner DET may determine the integrity of the first code path based on a result of the execution of the determination formula, that is, based on whether an output value of the determination formula is True or False. When the output value is True, the abnormal operation determiner DET may determine that the first code path has integrity. When the output value is False, the abnormal operation determiner DET may determine that the first code path has a defect.

When the output value of the abnormal operation determiner DET is not True, that is, when the output value is False, the first code path has a defect, and thus it may be determined that the first operation is an abnormal operation (operation S350).

When the output value of the abnormal operation determiner DET is True, the first code path has integrity, and thus it may be determined that the first operation is a normal operation (operation S360).

Figure 12:
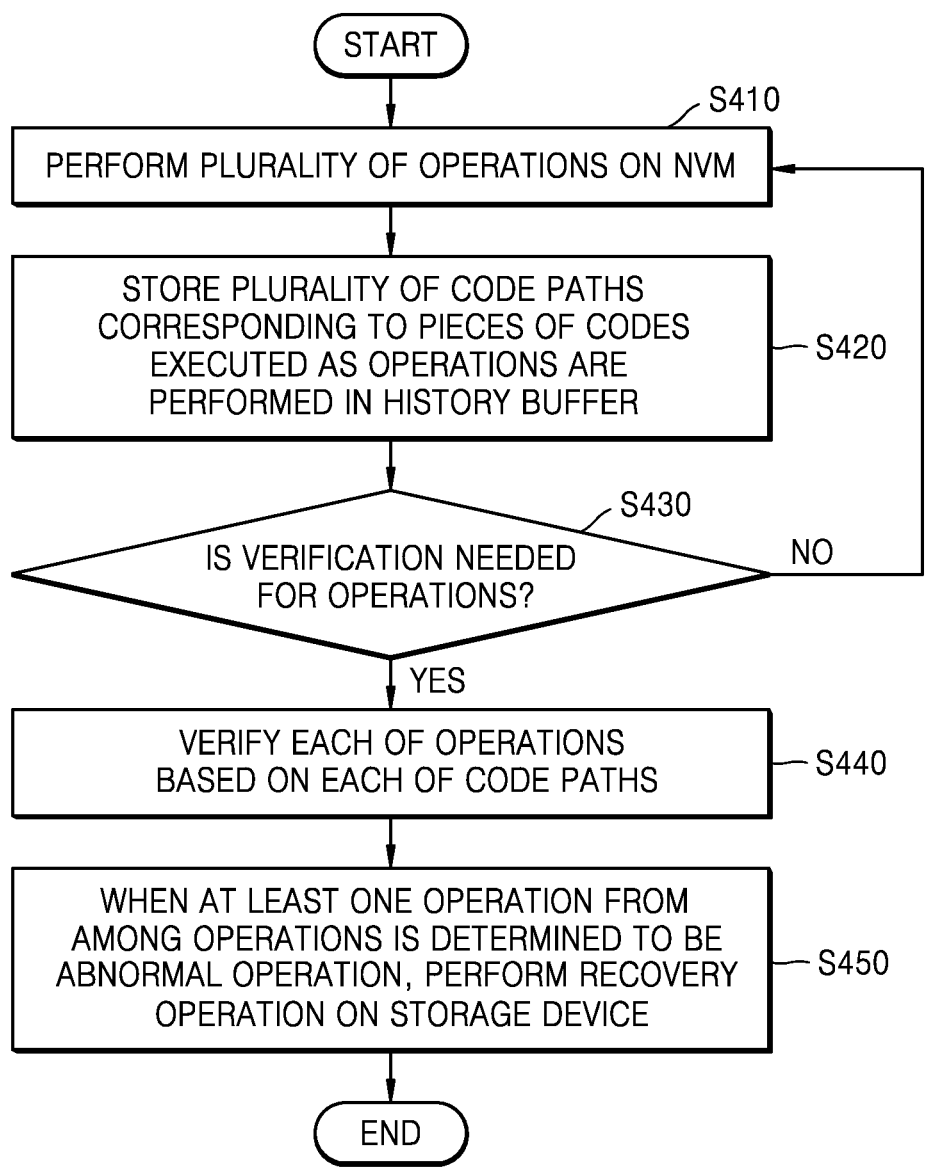
FIG. 12 is a flowchart showing an operation of a memory controller according to an example embodiment.

FIG. 12 is a flowchart showing an operation of a memory controller according to an example embodiment. The method of FIG. 12 may be performed by the memory controller 110 of FIG. 1, and the descriptions given above with reference to FIGS. 1 to 11 may also be applied to a method of operating the memory controller 110 of the present example embodiment.

Referring to FIGS. 1 and 12, the memory controller 110 may perform a plurality of operations on the NVM 120 (operation S410). For example, the operations may each be one of a write operation, a read operation, and an erase operation. However, example embodiments are not limited thereto, and the operations may each be one of various operations performed by the memory controller 110 to control the NVM 120.

The memory controller 110 may store a plurality of code paths corresponding to pieces of codes executed as each of the operations is performed in the history buffer HB (operation S420). The memory controller 110 may store a corresponding code path as each of the operations is performed in the history buffer HB. Therefore, a plurality of code paths may be stored in the history buffer HB.

The memory controller 110 may determine whether verification is needed for the operations (operation S430). For example, the memory controller 110 may determine whether it is necessary to verify whether the operations performed in operation S410 are normally performed or abnormally performed. For example, when the number of code paths stored in the history buffer HB is equal to or greater than a reference quantity or the remaining capacity of the storage capacity of the history buffer HB is less than or equal to a reference capacity, the memory controller 110 may determine that verification is needed.

In another example, when changed metadata needs to be stored in the NVM 120, the memory controller 110 may determine that the operations need to be verified. When at least one of the operations is performed incorrectly, changed metadata may include an incorrect data value, and, when the changed metadata including an the incorrect data value is stored in the NVM 120 and is continuously used, the storage device 100 may malfunction. Accordingly, the memory controller 110 may determine that it is needed to verify whether a plurality of operations previously performed have been performed normally or abnormally at a time point at which changed metadata needs to be stored in the NVM 120.

When it is determined that verification is not needed, the memory controller 110 may continue to perform a plurality of operations on the NVM 120 according to operation S410 and store code paths corresponding to pieces of code as each of the plurality of operations is performed in the history buffer HB according to operation S420.

When it is determined that verification is needed, the memory controller 110 may perform verification for each of the operations based on each of a plurality of code paths stored in the history buffer HB, thereby determining whether each of the operations is an abnormal operation or a normal operation (operation S440).

In an example embodiment, as described above with reference to FIG. 6, the abnormal operation determiner DET may compare each of a plurality of code paths with a plurality of reference code paths included in a code path dictionary and determine whether each of the operations is an abnormal operation or a normal operation based on whether each of the code paths matches the reference code paths.

In an example embodiment, as described above with reference to FIG. 11, the abnormal operation determiner DET may execute a determination formula by using each of the code paths as an input and determine whether each of the operations is an abnormal operation or a normal operation based on an output value of the determination formula.

When it is determined that at least one operation from among the operations is an abnormal operation, the memory controller 110 may perform a recovery operation for the storage device 100 (operation S450). In an example embodiment, the memory controller 110 may control the storage device 100 to be rebooted by performing a power-off sequence. In an example embodiment, the memory controller 110 may notify the host 100 that an abnormal operation has been performed and may perform the abnormal operation or the operations again in response to a retry request from the host 100.

When it is determined that the operations are normal operations, the memory controller 110 may erase a plurality of code paths corresponding to the operations stored in the history buffer HB. Alternatively, the memory controller 110 may store changed metadata in the NVM 120.

Figure 13:
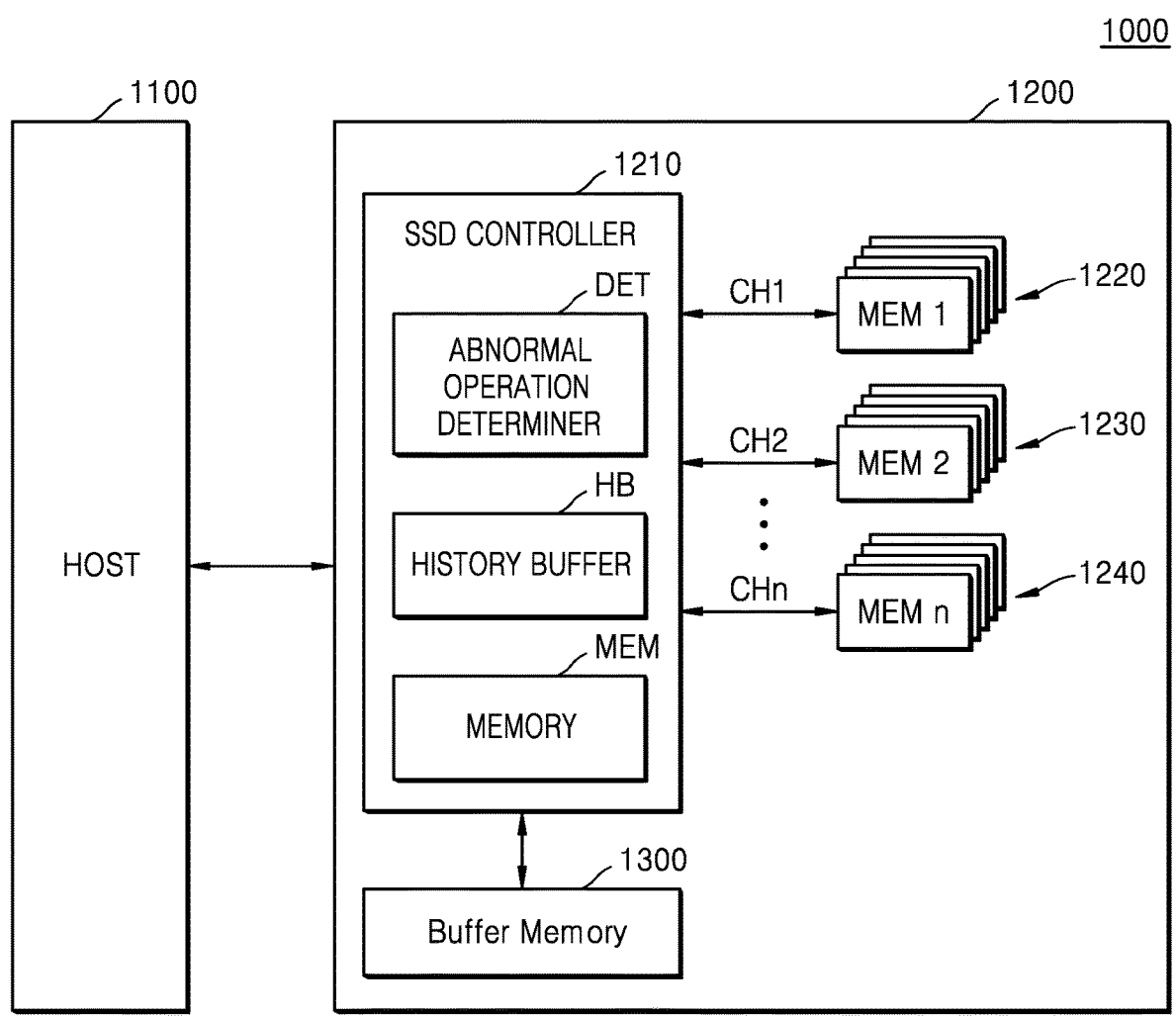
FIG. 13 is a block diagram showing an SSD according to an example embodiment.

FIG. 13 is a block diagram showing an SSD according to an example embodiment.

Referring to FIG. 13, an SSD system 1000 includes a host 1100 and an SSD 1200. The SSD 1200 may include an SSD controller 1210, a buffer memory 1300, and a plurality of NVM devices 1220, 1230, and 1240.

The SSD controller 1210 provides a physical connection between the host 1100 and the SSD 1200. The SSD controller 1210 provides interfacing between the host 1100 and the SSD 1200 according to a bus format of the host 1100. The bus format of the host 1100 may include universal serial bus (USB), small computer system interface (SCSI), PCI express, ATA, parallel ATA (PATA), serial ATA (SATA), serial attached SCSI (SAS), etc.

The SSD controller 1210 may include the abnormal operation determiner DET, the history buffer HB, and the memory MEM. In an example embodiment, the history buffer HB may be implemented as a part of the memory MEM. The memory controllers 100, 100a, and 100b according to example embodiments described above with reference to FIGS. 1 to 12 may be applied as the SSD controller 1210.

The SSD controller 1210 may store a first code path for a first operation performed on the NVM devices 1220, 1230, and 1240, e.g., one of a write operation, a read operation, and an erase operation, in the history buffer HB. Pieces of codes constituting a plurality of operations and metadata may be loaded to the memory MEM. The first code path may include addresses of a plurality of code paths constituting the first operation in the memory MEM. The abnormal operation detection unit DET may verify whether the first operation is normally performed, that is, whether the first operation is a normal abnormal operation or a normal operation based on the first code path. When it is determined that the first operation is an abnormal operation, the SSD controller 1210 may perform the first operation again or control the SSD 1200 to be rebooted by performing a power-off sequence of the SSD 1200.

The buffer memory 1300 may temporarily store write data provided from the host 1100 or data read from the NVM devices 1220, 1230, and 1240. In an example embodiment, the history buffer HB may be implemented as a part of the buffer memory 1220 or at least one of pieces of codes and metadata may be loaded to the buffer memory 1220. For example, the codes and the metadata may be stored in the NVM devices 1220, 1230, and 1240, the codes may be loaded to the memory MEM in the SSD controller 1210, and the metadata may be loaded to the buffer memory 1220.

The NVM devices 1220, 1230, and 1240 are provided as storage media for the SSD 1200. For example, the NVM devices 1220, 1230, and 1240 may be provided as NAND-type flash memories having a large storage capacity. The NVM devices 1220, 1230, and 1240 are connected to the SSD controller 1210 through a plurality of channels CH1, CH2, . . . , and CHn. Although the descriptions are given above on the assumption that the NVM devices 1220, 1230, and 1240 are implemented with NAND flash memories as storage media, example embodiments are not limited thereto, and the NVM devices 1220, 1230, and 1240 may also be implemented with other NVMs. For example, the NVM devices 1220, 1230, and 1240 may be implemented with a PRAM, an MRAM, a ReRAM, an FRAM, a NOR flash memory, etc., or may include a combination of different types of NVMs.

While example embodiments have been particularly shown and described, it will be understood that various changes in form and details may be made therein without departing from the spirit and scope of the following claims.

What is claimed is:

1. A method of operating a memory controller configured to control a non-volatile memory, the method comprising:
    performing a first operation on the non-volatile memory;
    storing a first code path corresponding to pieces of codes executed as the first operation is performed in a history buffer;
    comparing the first code path with a plurality of reference code paths related to the first operation; and
    identifying whether the first operation is abnormally performed based on a result of the comparison.

2. The method of claim 1, wherein the first code path comprises a plurality of code addresses respectively corresponding to the codes, and the code addresses are sorted according to an execution order of the codes.

3. The method of claim 1, wherein the identifying comprises:
    identifying the first code path does not match any one of the plurality of reference code paths; and
    identifying that the first operation is abnormally performed based on the first code path not matching any one of the plurality of reference code paths.

4. The method of claim 1, further comprising:
    before performing the first operation, obtaining the plurality of reference code paths; and
    storing the plurality of reference code paths.

5. The method of claim 1, wherein the plurality of reference code paths comprise a plurality of code paths corresponding to a plurality of normal operations.

6. The method of claim 1, wherein the first code path further comprises a data address indicating a location at which data generated as the first operation is performed is stored and a data value.

7. The method of claim 6, wherein, the identifying comprises:
    identifying the first code path matches at least one of the plurality of reference code paths;
    identifying the data address and the data value are within a data address range and a data value range determined based on the plurality of reference code paths; and
    identifying the first operation is normally performed based on the first code path matching at least one of the plurality of reference code paths, the data address being within the data address range and the data value being within the data value range.

8. The method of claim 1, further comprising changing metadata stored in the non-volatile memory as the first operation is performed after the comparing.

9. The method of claim 1, further comprising identifying an available storage capacity of the history buffer becomes less than or equal to a reference capacity,
    wherein the comparing is performed based on the available storage capacity being identified as less than or equal to the reference capacity.

10. The method of claim 1, wherein the first operation comprises any one or any combination of a write operation, a read operation, and an erase operation.

11. A method of operating a memory controller configured to control a non-volatile memory, the method comprising:
    performing a first operation on the non-volatile memory;
    storing a first code path corresponding to pieces of codes executed as the first operation is performed in a history buffer;
    executing a formula based on the first code path, wherein the formula is generated based on a plurality of normal reference code paths related to the first operation; and
    identifying whether the first operation is abnormally performed based on an output of the formula.

12. The method of claim 11, further comprising:
    before performing the first operation, obtaining the plurality of reference code paths corresponding to a plurality of normal operations; and
    generating the formula based on the plurality of reference code paths through machine learning.

13. The method of claim 11, wherein the identifying comprises:
    identifying the first operation is normally performed based on the output being True, and identifying the first operation is abnormally performed based on the output being False.

14. The method of claim 11, wherein the first code path comprises a plurality of code addresses respectively corresponding to the codes, and the code addresses are sorted according to an execution order of the codes.

15. The method of claim 11, wherein the first code path further comprises a data address indicating a location at which data generated as at least one code from among the codes is performed is stored.

16. A storage device comprising: a non-volatile memory; and a memory controller configured to control the non-volatile memory, wherein the memory controller comprises: a history buffer configured to store a plurality of code paths respectively corresponding to a plurality of operations performed on the non-volatile memory; and a processor configured to implement an abnormal operation determiner configured to identify whether the operations are performed normally or abnormally based on the code paths, wherein each of the plurality of code paths comprises a plurality of code addresses respectively corresponding to pieces of codes executed as a corresponding operation is performed and wherein the code addresses are sorted according to an execution order of the codes.

17. The storage device of claim 16, wherein at least one of the code paths further comprises a data address at which data generated or changed as a corresponding operation is performed is stored and a data value corresponding to the data, and wherein the data address comprises any one or any combination of a memory address, an address of a hardware functional block provided in the memory controller, and an address of a register provided in the hardware functional block.

18. The storage device of claim 16, wherein the abnormal operation determiner is further configured to compare the first code path with a plurality of reference code paths obtained in advance and, based on at least one of the plurality of reference code paths matching the first code path, identify that the first operation is normally performed.

19. The storage device of claim 16, wherein the abnormal operation determiner is further configured to provide the first code path to a determination formula generated based on a plurality of reference code paths obtained in advance and identify whether the first operation is normally performed or abnormally performed based on a result of executing performed according to the determination formula.

* * * * *